United States Patent [19]

Bueti et al.

[11] Patent Number: 5,417,127
[45] Date of Patent: May 23, 1995

[54] ADJUSTABLE DEVICE FOR DEPRESSING A VEHICLE PEDAL TO A PREDETERMINED SETTING

[76] Inventors: Anthony Bueti, 12 Pine View Rd.; John Bueti, 62 New Castle Dr., both of Mount Kisco, N.Y. 10549

[21] Appl. No.: 188,118
[22] Filed: Jan. 28, 1994

Related U.S. Application Data

[63] Continuation-in-part of Ser. No. 947,387, Sep. 21, 1992, abandoned.

[51] Int. Cl.⁶ .......................... G05G 5/12; G05G 1/21; G05G 1/14
[52] U.S. Cl. ......................... 74/532; 74/482; 254/100; 254/DIG. 5
[58] Field of Search .................. 74/481, 482, 532; 70/201, 202, 238; 254/98, 100, DIG. 5; 73/132

[56] References Cited

U.S. PATENT DOCUMENTS

| | | | |
|---|---|---|---|
| 1,554,468 | 9/1925 | Tague | 254/DIG. 5 X |
| 1,596,834 | 8/1926 | Herbert et al. | 74/532 |
| 1,691,822 | 11/1928 | Lindmeyer | 254/DIG. 5 X |
| 2,043,479 | 6/1936 | Greiman | 254/100 |
| 2,731,232 | 1/1956 | Lucker | 254/98 X |
| 2,756,964 | 7/1956 | Hogan | 254/98 |
| 2,866,356 | 12/1958 | Elam | 74/532 |
| 2,910,270 | 10/1959 | Schultz | 254/98 |
| 2,917,142 | 12/1959 | Thorner | 74/482 X |
| 2,960,885 | 11/1960 | Donaldson | 74/532 |
| 3,315,539 | 4/1967 | Solberg | 74/532 |
| 3,910,135 | 10/1975 | Phillips | 74/532 |
| 4,480,496 | 11/1984 | Marshall | 74/513 |
| 5,119,688 | 6/1992 | Snyder, Jr. | 74/482 |

OTHER PUBLICATIONS

Deutschman, Aaron D. Machine Design; theory and practice, Macmillan Pub. Co. N.Y. N.Y. 1975 p. 794-799.

*Primary Examiner*—Allan D. Herrmann
*Attorney, Agent, or Firm*—Alfred E. Miller

[57] ABSTRACT

A portable rod-like device for depressing a vehicle pedal, such as an accelerator or a brake pedal to a predetermined setting and maintaining that setting in the form of a screw-threaded rod and a mating screw-threaded nut having a hook. The nut rides up the screw-threaded rod and engages the steering wheel of the vehicle while the other end of the rod engages the pedal. The rod depresses the accelerator pedal against spring pressure while the engine is operating and the accelerator pedal is depressed to a point whereby a predetermined setting has been reached on the tachometer of the vehicle, and maintained at that setting. The device can be finely adjusted in small increments. The foot at the free end of the rod frictionally engages the accelerator pedal and can be mounted in either a fixed position or can be swivel mounted.

3 Claims, 2 Drawing Sheets

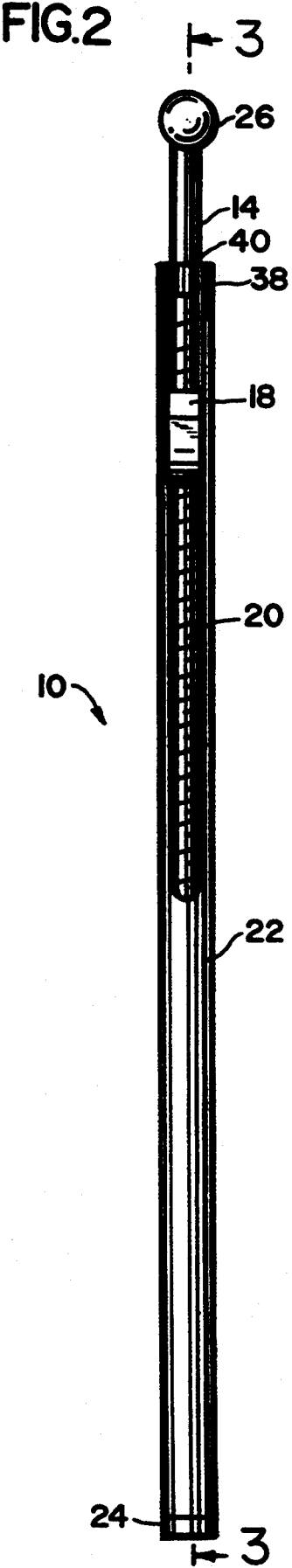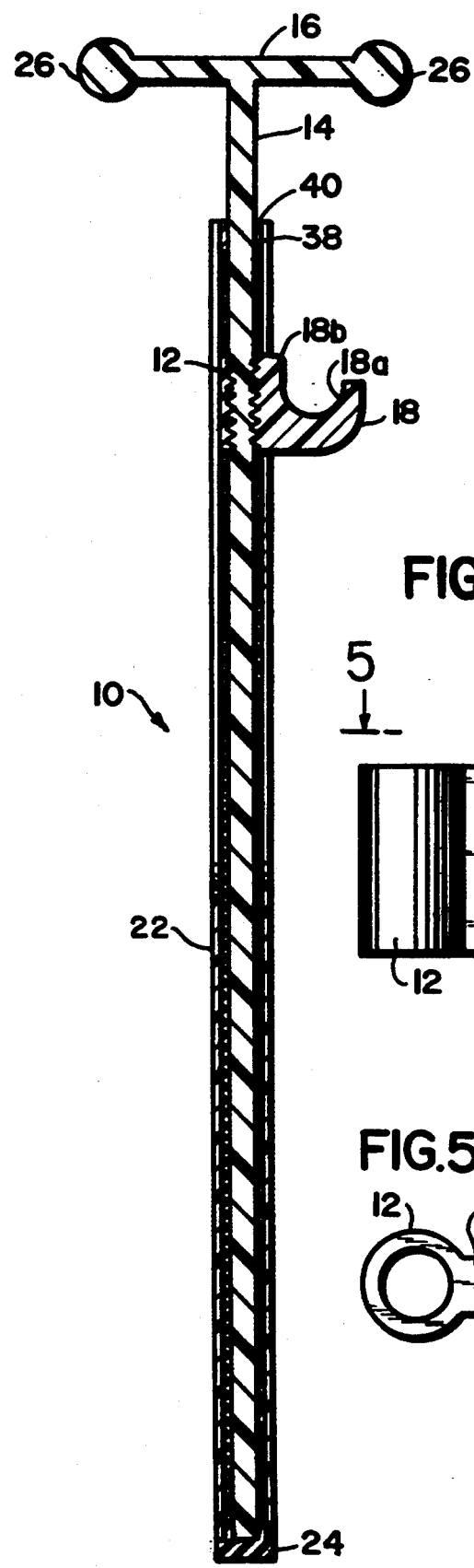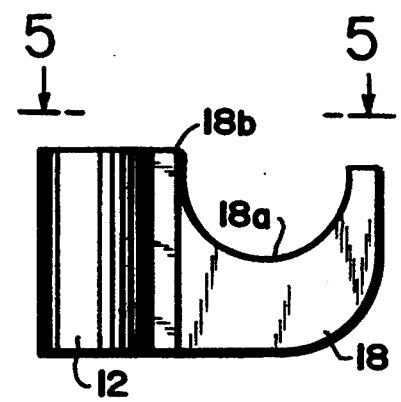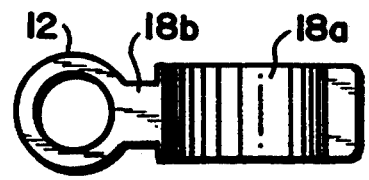

ADJUSTABLE DEVICE FOR DEPRESSING A VEHICLE PEDAL TO A PREDETERMINED SETTING

This application is a continuation-in-part of application Ser. No. 07/947,387, filed Sep. 21, 1992, now abandoned.

The present invention relates to a portable device for depressing a vehicle pedal such as accelerator or a brake pedal to a predetermined setting.

BACKGROUND OF THE INVENTION

In vehicle servicing and inspection operations, it is often necessary to maintain the vehicle engine at a specific RPM so that various procedures can be performed on the engine such as adjusting the carburetor or the fuel injection system. Moreover, in many state inspection procedures it is necessary to maintain the engine at a required RPM for a given period of time. Consequently, it is necessary for the driver to sit in the car and carefully depress the gas pedal to a predetermined setting for an elapsed time period while making sure that the setting does not vary during that period.

Furthermore, in the connection with automobile servicing, without the present device, a second automobile mechanic would be required to sit within the vehicle and hold the accelerator pedal down while the motor is being tuned up. This procedure of manually holding the accelerator pedal down for a period of time is not always satisfactory in that the foot becomes tired during that period and may relax against the spring pressure so that the RPMs of the accelerator pedal may vary.

The uniform depression of a gas pedal has been addressed in U.S. Pat. No. 2,866,356 to Elam, however the tool shown therein is relatively complicated since it has a number of interacting parts and does not provide for a fine adjustment of the gas pedal depression so that the RPM's can be increased or reduced by small increments depending on the necessary requirements of adjusting the present fuel injected engines. Another patent relating to the present subject matter is U.S. Pat. No. 4,480,496 to Marshall in which the accelerator pedal of a diesel engine is connected by a threaded rod to the fire wall of a truck. This arrangement is fixed for the particular truck involved and is not portable. Furthermore, also the fine adjustment of the engine RPMs cannot be achieved by such a structure.

SUMMARY OF THE INVENTION

It is a feature of the present invention to provide a portable device for uniformly depressing a vehicle pedal, such as an accelerator pedal, in order to set and maintain a predetermined RPM on the tachometer on the instrument panel of a vehicle for a predetermined time period.

It is a further feature of the present invention to provide a portable tool device which can be inserted through an open window of a vehicle and fixed in position by a person standing on the outside of the vehicle.

It is a further object of the invention to provide a pedal depressing device which can be used on the brake pedal as well as on the accelerator pedal in order for the mechanic to perform certain operations in connection with the servicing of the vehicle, such as testing the lights as well as the electrical system.

Another object of the present invention is to provide a pole device for depressing a gas pedal which is fabricated of three separate pieces which are easily assembled together and is relatively inexpensive, but is reliably effective for the purposes intended.

A further feature of the present invention is to provide a pole device being a threaded rod within the sleeve and provided with a screw-threaded nut having a hook which rides up said screw-threaded rod to engage under the steering wheel of the vehicle, while the bottom of the threaded rod engages a pedal to depress the same depending upon the amount of turns the screw-threaded rod is rotated while the hook tightly engages the steering wheel.

A further feature of the present invention is to provide the specific pitch of the screw threads which permits the end of the threaded rod to be finely adjusted against the accelerator pedal.

DESCRIPTION OF THE DRAWINGS

The above features and objects of our invention will be more fully understood by the following description of the construction and operation in the specification and by reference to the accompanying drawings forming a part thereof in which:

FIG. 2 is a front elevational view of the adjustable tool device as shown in FIG. 1.

FIG. 3 is a sectional view taken along the lines 3—3 of FIG.

FIG. 4 is a side elevational view of the screw threaded nut and integral hook shown in FIGS. 2 and 3.

FIG. 5 is a top plan view of the threaded nut and hook.

DESCRIPTION OF THE PREFERRED EMBODIMENTS OF THE INVENTION

Figure 1:
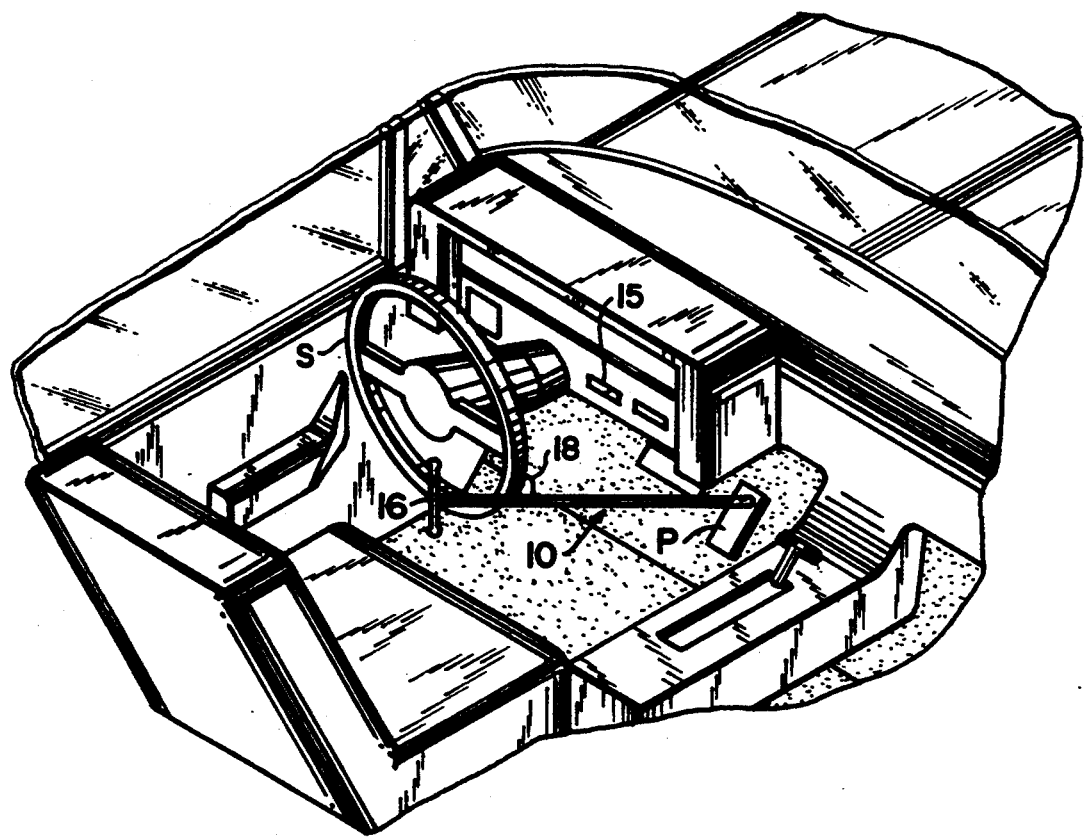
FIG. 1 is a perspective view of the partial interior of an automobile showing the adjustable tool device in operative position connected on the steering wheel of the vehicle while the end thereof is depressed against the accelerator pedal.

In FIG. 1, the portable adjustable device for depressing the vehicle pedal is shown attached adjacent to one end on the vehicle steering wheel while the other end of the device engages a pedal of an automobile, such as the accelerator pedal, which is normally spring urged into an inoperative position. The tool is in the form of an elongated rod, which is referred to generally by the reference numeral. 10. The rod 10 is more specifically shown in FIGS. 2-5, in which the pedal depressing device takes the form of a screw-threaded rod 14 having a mating screw-threaded nut 12 that rides up and down the rod depending on the direction of rotation of the rod's transverse handle 16.

The nut 12 is provided with a hook element 18, which is preferably integral. As seen in FIG. 2, the nut 12 and the hook element 18 moves freely up and down in the slot 20 of the outer sleeve 22 within which the rod 14 is housed. The rod is provided with a rubber cap 24 at the free end thereof, or other suitable end elements which will be described hereinafter.

The handle 16 is also provided preferably with enlarged opposite end members 26 so that the operator can conveniently rotate rod 14 clockwise or counterclockwise without the grasping hand slipping off the handle. Other types of grips may be employed such as a knob fixed perpendicular to the handle (not shown). We came to the conclusion, after experimentation, that it was necessary to have a thread pitch on the rod thread as well as on the mating movable hook that will slowly, incrementally and accurately depress the vehicle pedal. With that in mind, the thread pitch on the rod has been selected to be 5/16/18" which is most suitable for a fine adjustment and that allows the operator to adjust the length of the rod between the steering wheel and the foot pedal so that the foot pedal can be depressed by means of the cap 24 engaging the pedal against the pedal spring pressure to the proper setting of the pedal wherein the required RPMs on the tachometer are set. Thereafter, the tool device is firmly in place and the tachometer reading will not vary from the predetermined setting. It should be noted that the accelerator pedal and the linkages to the motor of a vehicle are sensitive. Consequently, a turn of the handle with an improper screw thread can easily raise the RPM by 200, thus making the adjustment inaccurate. Furthermore, if the RPM setting is near the indicator red line the turning of the handle with an improper screw thread for a fine adjustment can cause damage to the engine. Thus, the small, incremental adjustment by means of a screw thread with pitch of 5/16×18" when rotated by the handle of the present device will slowly change the RPM setting so that precise, accurate settings can be achieved.

Referring now to FIG. 5, Section 18(a) of the hook has a wider diameter than the connecting part 18(b) so that a firm grip of the steering wheel is assured, thus creating a stable pedal depressing device while the operator or mechanic works on the engine.

Figures 6, 7:
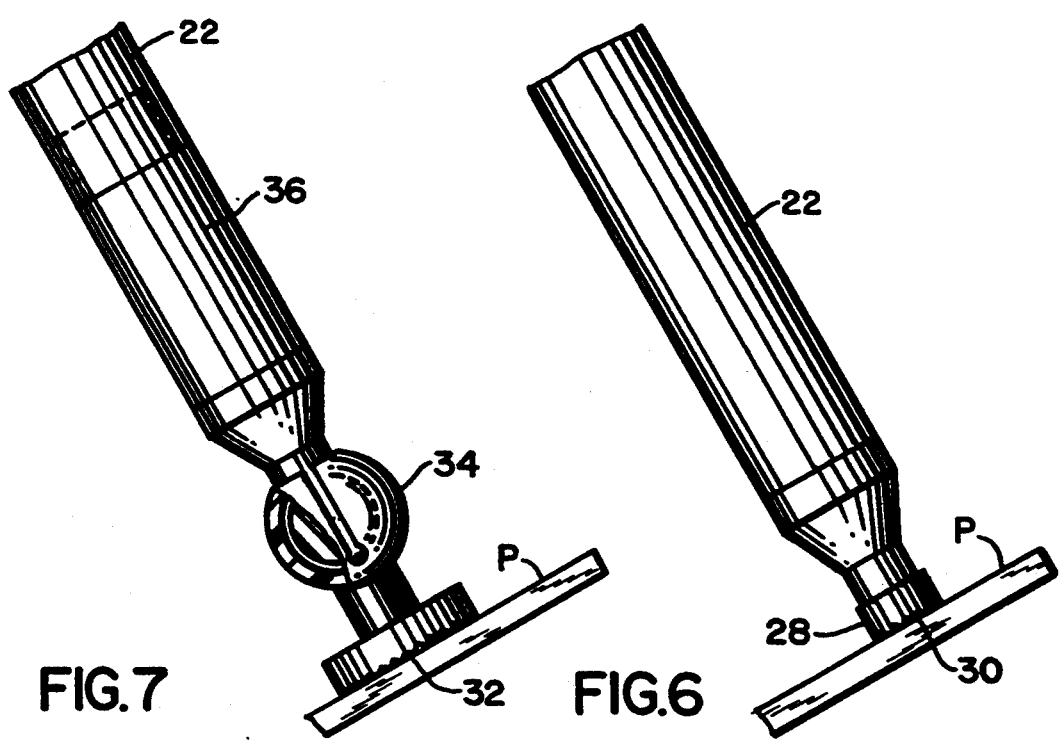
FIG. 6 is a front elevational view of an alternate embodiment of the invention showing the foot having a serrated surface engaging the pedal and, FIG. 7 is a front elevational view of an alternate embodiment of the invention in which the foot is pivotable and is provided with a serrated surface engaging the pedal.

FIG. 6 shows an alternate embodiment of the present invention in which the foot of the pedal depressing device is provided with a cap 28 which has a serrated bottom surface 30 that firmly engages the accelerator foot pedal P of a vehicle which normally is provided with a striated rubber covering. This arrangement further prevents dislocation of the present pedal depressing device from it's setting.

FIG. 7 is another embodiment of the present invention which is provided with a serrated pedal-engaging bottom surface 32, as well as a swivel connection 34 in the form of a circular member, which is rotatably connected to an optional extension 36, the later being removably attached to the bottom of elongated rod 10.

As seen in FIGS. 2 and 3, a bearing 38 with a central hole 40 is shown at the top of the sleeve 22 whereby the rod 14 moves freely therethrough.

In operation it is possible for the mechanic servicing an automobile to insert this pedal depressing tool device through an open window on the driver's side and place the bottom end of the adjustable tool device against the vehicle pedal, such as an accelerator pedal or a brake pedal. In the case of the tool being used on the accelerator pedal, the handle of the device is rotated in the proper direction to cause the nut 12, with it's hook 18, to ride up the screw-threaded rod until it engages the steering wheel S. The pedal is consequently depressed by an amount determined by the extent the handle 26 is rotated. Upon further engagement, the accelerator pedal P can be further depressed in increments, which can be finely adjusted while the mechanic, with the engine in operation, can determine the exact setting of the tachometer for the required RPMs of the engine so servicing can be done in a reliable and competent manner.

The adjustable rod depressing device is light in weight and portable and is adaptable to any type of vehicle. It is preferable to construct the present device of high impact plastic material which will remain serviceable despite continued usage.

While the present application has been disclosed and described with reference to certain embodiments thereof, it is apparent that other variations and modifications may be made which fall within the true spirit and scope of the invention, as defined in the following claims:

What we claim is:

1. A portable device for depressing and holding a spring-loaded pedal of a vehicle to a predetermined setting, said vehicle having a steering wheel comprising: an elongated rod being at least partly threaded, an elongated sleeve for said rod having a slot extending substantially parallel to the longitudinal axis of said sleeve, a screw threaded portion of said rod, said rod having an integral hook extending substantially perpendicular to the axis of said sleeve, said screw-threaded nut having a diameter of 5/16 of an inch and a pitch of 18 threads per inch, a handle at one end of said rod, an extension member for removable attachment at one end to the other end of the rod remote from said handle, and a foot attached to the other end of said extension member whereby when said hook engages said steering wheel and the handle of said rod is rotated in a predetermined direction the mating threads permit small incremental adjustments of the depression of the vehicle pedal upon further rotation of the handle in one direction.

2. The device as claimed in claim 1 wherein said handle is provided with enlarged members on opposite ends of said handle.

3. A portable device for depressing and holding a spring-biased vehicle pedal of a vehicle to a predetermined setting, said vehicle having a steering wheel, comprising: an elongated rod at least partially threaded and having means for removably attaching said rod to said steering wheel, said thread having a diameter of 5/16" and a pitch of 18 threads per inch, an elongated sleeve having a slot extending substantially parallel to the longitudinal axis of said sleeve, a mating threaded nut on the threaded portion of said rod and a foot at the opposite end thereof, said handle extending perpendicular to the axis of said rod, an extension connected to the free end of said rod, and a circular member being a swivel connection rotatably connected to the free end of said extension and having an element provided with a serrated pedal-engaging surface.

* * * * *